United States Patent [19]
Auchapt-Tavenaux et al.

[11] 4,312,836
[45] Jan. 26, 1982

[54] APPARATUS FOR THE CONTINUOUS TREATMENT OF THE COMPOUNDS IN A CORROSIVE LIQUID

[75] Inventors: Jacqueline Auchapt-Tavenaux, Avignon; Pierre Auchapt, Bagnols sur Ceze; Henri Sauvage, Bagnols sur Ceze; Maurice Tarnero, Bagnols sur Ceze, all of France

[73] Assignee: Commissariat a l'Energie Atomique, Paris, France

[21] Appl. No.: 210,612

[22] Filed: Nov. 26, 1980

[30] Foreign Application Priority Data

Dec. 18, 1979 [FR] France ................................ 79 30952

[51] Int. Cl.³ .............................................. B01F 1/00
[52] U.S. Cl. .................................... 422/198; 422/233; 422/268; 422/272; 422/285
[58] Field of Search ................ 422/198, 232, 233, 239, 422/268–272, 285, 290, 159

[56] References Cited

U.S. PATENT DOCUMENTS

| | | | |
|---|---|---|---|
| 1,823,813 | 9/1931 | Wurster | 422/285 X |
| 2,760,888 | 8/1956 | Bonath et al. | 422/269 X |
| 3,181,593 | 5/1965 | Lindley | 422/290 X |
| 3,632,445 | 1/1972 | Barre | 422/270 X |
| 3,725,013 | 4/1973 | Kavepa et al. | 422/269 |
| 3,853,615 | 12/1974 | Backofen et al. | 422/272 X |

FOREIGN PATENT DOCUMENTS 2125412  9/1972  France .

Primary Examiner—William A. Cuchlinski, Jr.

[57] ABSTRACT

Apparatus for treating the compounds in a corrosive liquid comprising a fixed tank in which the liquid is placed, a horizontally axed rotary support which peripherally carries at least one bucket for receiving the compound to be treated, means for introducing the compound into the bucket, means for removing the compound from the bucket, means for rotating the rotary support about its shaft and means for guiding the rotary support during its rotation about its shaft, wherein the guidance means are entirely arranged within the tank, the guidance means and the driving means being positioned above a horizontal plane passing through the axis of the rotary support.

13 Claims, 4 Drawing Figures

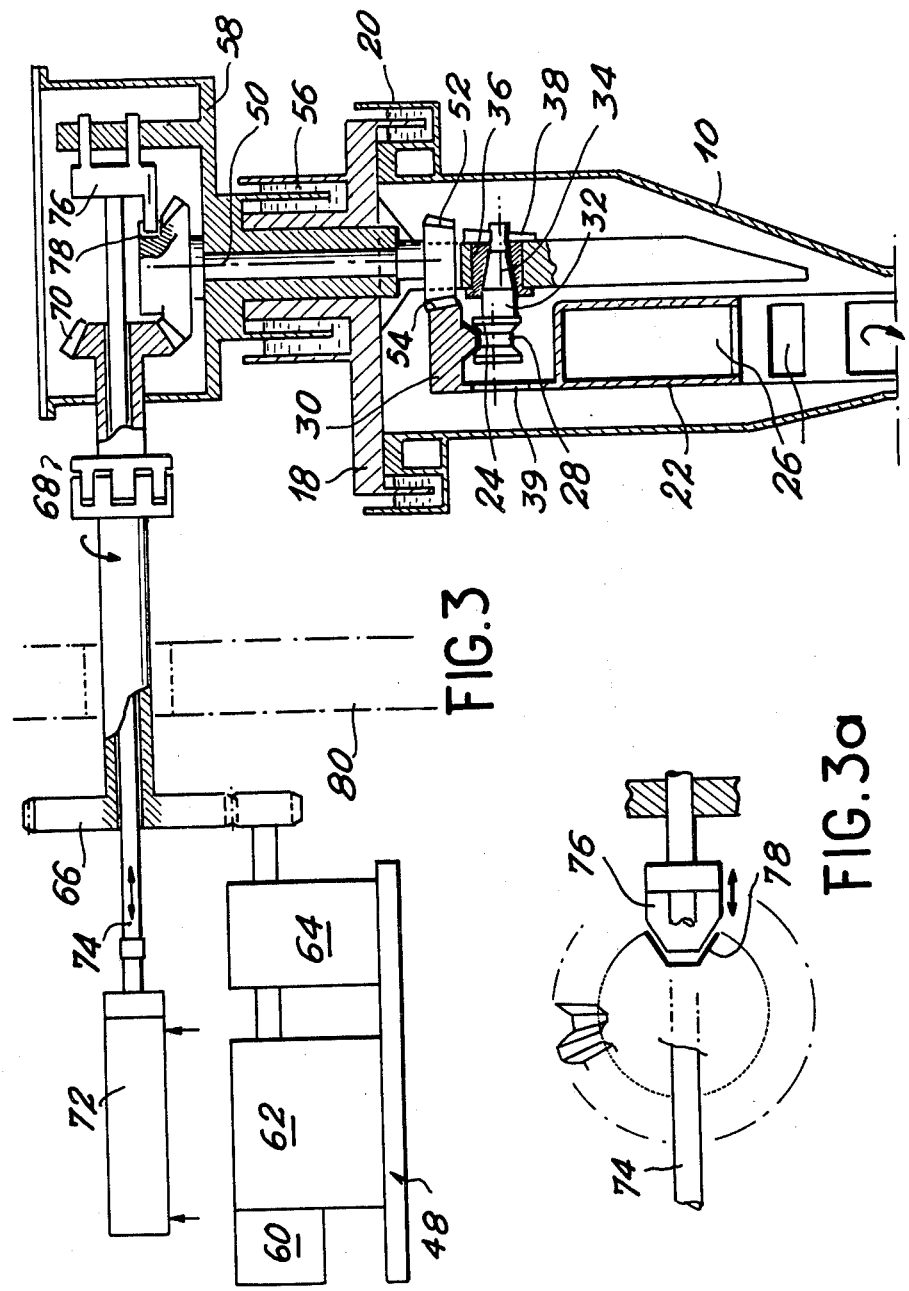

APPARATUS FOR THE CONTINUOUS TREATMENT OF THE COMPOUNDS IN A CORROSIVE LIQUID

BACKGROUND OF THE INVENTION

The invention relates to an apparatus making it possible to continuously treat compounds in a corrosive liquid and more particularly intended for dissolving nuclear fuels in boiling nitric acid during the reprocessing of said fuels.

During the different reprocessing stages of nuclear fuels, it is known that the rods containing said field are generally sheared into sections before being immersed in a boiling nitric acid bath which serves to separate the fuel from the mechanical parts. Thus, the nuclear fuel is dissolved in nitric acid, whilst the can fragments and the other metal parts are not dissolved.

Among the different known apparatuses making it possible to dissolve nuclear fuels in nitric acid an apparatus is known in which the acid is placed in a fixed tank, the can fragments being successively introduced into the buckets of a bucket wheel which rotates so as to immerse the fragments in acid, after which the fragments and other undissolved parts are removed in order to discharge them out of the apparatus. In this known apparatus, the bucket wheel is driven and supported by a shaft which traverses the tank walls and which is rotated by a motor positioned outside the vessel. The axial guidance of the bucket wheel is by means of a system of rails and rollers positioned between the tank and outer periphery of the wheel.

This known apparatus has a number of disadvantages mainly resulting from the corrosive nature of the hot nitric acid used.

One of the disadvantages is due to the rotation of the wheel by a shaft passing through the vessel walls level with the wheel axle, i.e. in a part of the vessel positioned just above the level of the acid. During the dissolving of the nuclear fuels in the nitric acid bubbling takes place on the surface level thereof leading to a spattering of the boiling acid above the level occupied by the acid at rest. This spattering of acid leads very rapidly to the damaging of the rotary gaskets necessary for the tightly sealed passage of the wheel drive shaft.

Another disadvantage of this known apparatus also due to the corrosive nature of the boiling nitric acid, is the arrangement of a certain number of wheel guide rollers directly in the acid. This leads to the risk of these rollers being very rapidly damaged to the extent that they are no longer usable. This latter disadvantage is made worse by the fact that it is not possible to dismantle and replace the rollers in the aforementioned apparatus.

BRIEF SUMMARY OF THE INVENTION

The object of the present invention is to provide an apparatus for treating the compounds in a corrosive liquid and in particular for dissolving nuclear fuels in nitric acid during the reprocessing of said fuels, which is substantially of the same type as the known apparatus described hereinbefore, but which does not have the disadvantages thereof.

The present invention therefore relates to an apparatus for treating the compounds in a corrosive liquid comprising a fixed tank in which the liquid is placed, a horizontally axed rotary support which peripherally carries at least one bucket for receiving the compound to be treated, means for introducing the compound into the bucket, means for removing the compound from the bucket, means for rotating the rotary support about its shaft and means for guiding the rotary support during its rotation about its shaft, wherein the guidance means are entirely arranged within the tank, the guidance means and the driving means being positioned above a horizontal plane passing through the axis of the rotary support.

Thus, according to the invention, the mechanical means which drive and guide the bucket wheel are entirely positioned within the upper part of the tank located above the liquid level, the latter being below the bucket wheel axis. This makes it possible to virtually completely eliminate the corrosive effects by liquid nitric acid on the mechanical parts and on the rotary joint necessary for the rotation of the wheel by an external motor.

According to a preferred embodiment of the invention, the guidance means are constituted by support means arranged symmetrically with respect to a vertical plane passing through the rotary support axis. Preferably, the support means then comprise two series of at least one roller arranged symmetrically to the said vertical plane.

According to another feature of the invention, the apparatus comprises a detachable cover sealing the tank in a tight manner and carrying the rotary support via guidance means. The means for introducing the compound into the liquid may comprise an intake chute having an outer portion carried by the tank and an inner portion carried by the cover, the intake chute issuing into a hopper carried by the cover and the means for discharging the compound out of the bucket may comprise a discharge chute having an outer part carried by the tank and an inner part carried by the cover.

When the apparatus according to the invention comprises a detachable cover, the means for rotating the rotary support preferably comprise a motor system outside the tank controlling the rotation of a shaft traversing the cover and carrying a driving pinion located within the vessel and cooperating with a toothed wheel integral with the rotary support. The shaft can then have a vertical axis, a hydraulic guard ensuring the sealing between the shaft and the cover.

According to yet another feature of the invention, the apparatus also comprises means for the recentering of the bucket with respect to the means for introducing the compound into the bucket.

When the rotary support is supported by rollers and when the tank is sealed by a detachable cover the rollers are preferably carried by said cover, each roller then being received on a shaft fixed to the cover by removable fixing means, the shaft axis level with the roller being offset relative to its axis level with the cover so as to permit the removal of the rollers by rotating the shafts.

According to yet another feature of the invention, the bottom of the tank is inclined so as to define a ramp bringing compounds which have dropped accidentally into the tank in front of a suction system which reintroduces them into the bucket.

BRIEF DESCRIPTION OF THE DRAWINGS

The invention is described in greater detail hereinafter relative to non-limitative embodiments and the attached drawings, wherein show:

FIG. 3 a larger scale view showing the mechanism for rotating the bucket wheel, as well as the system for recentering said wheel.

FIG. 3a a detail of the recentering system.

DETAILED DESCRIPTION OF THE PREFERRED EMBODIMENTS

Figure 1:
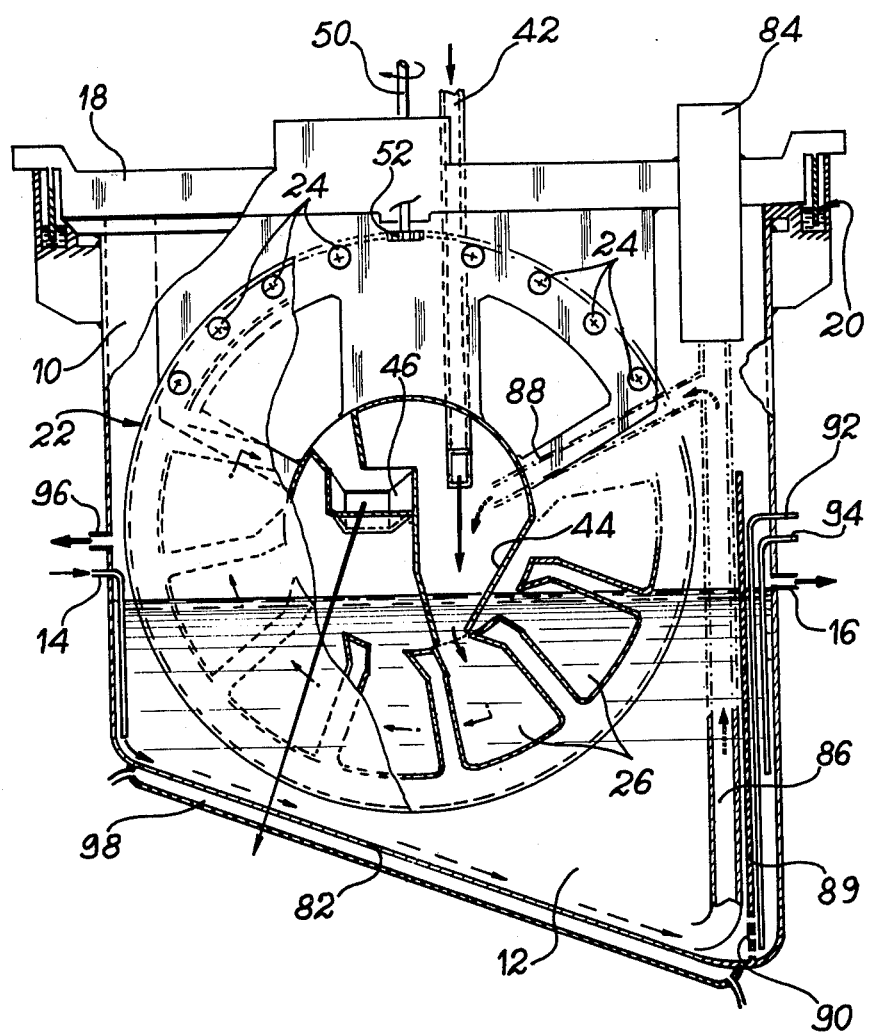
FIG. 1 a part sectional elevation of an apparatus for dissolving nuclear fuels in nitric acid.
Figure 2:
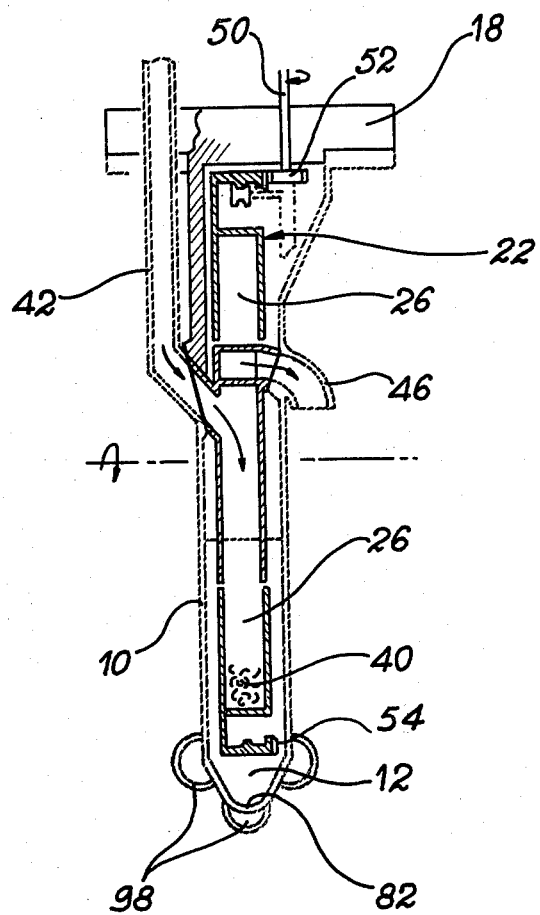
FIG. 2 a cross-sectional view of the apparatus of FIG. 1 level with the bucket wheel axis.

The apparatus for treating compounds in a corrosive liquid shown in FIGS. 1 and 2 is more particularly intended for dissolving nuclear fuels in boiling nitric acid during the reprocessing of said fuels.

To this end, the apparatus comprises a tank 10 into which the nitric acid 12 is introduced by means of a feed pipe 14. The acid level in the tank is also established by means of a discharge pipe 16 in the form of an overflow pipe by means of which the nuclear fuel dissolved in the acid is removed during the operation of the apparatus.

Tank 10 is tightly sealed and is closed in its upper part by a cover 18. The seal between tank 10 and cover 18 is provided by a hydraulic guard 20.

According to the invention, cover 18 carries a vertically axed rotary support 22 via guidance and support means constituted in the represented embodiment by two series of four rollers 24 arranged symmetrically with respect to the vertical plane passing through the axis of support 22.

As is more particularly illustrated in FIG. 1, rotary support 22 is constituted by a bucket wheel having a certain number of identical buckets 26, regularly distributed around the periphery of wheel 22, each of said buckets 26 issuing into the latter. The level of acid 2 or the nuclear fuel solution in the acid determined by the overflow pipe 16 is below the axis of wheel 22.

One of the rollers 24 constituting the support and guidance means of wheel 22 is represented on a larger scale in FIG. 3. Each of the rollers 24 has a groove 28 in which is received an annular projection 30 formed on the inner face of the rim of wheel 22. The cooperation between projection 30 and grooves 28 ensures the axial guidance of wheel 22 with respect to cover 18 and consequently with respect to tank 10. Each roller 24 is mounted in rotary manner by means of ball or roller bearings (not shown) on a shaft 32 detachably fixed to cover 18. To this end, shaft 32 comprises a frustum-shaped portion 34 received in a sleeve 36 fixed to cover 18 by any appropriate means such as e.g. screws. A wedge 38 traverses the free end of shaft 32 and rests on the fixed sleeve 36 so as to immobilise shaft 32 in the latter by friction. In addition, the part of shaft 32 carrying roller 24 is offset with respect to the frustum-shaped portion 34 so as to permit the removal of roller 24 by rotating shaft 32 within sleeve 36 after removing wedge 38. Holes 39 made in the rim of wheel 22 then permit the passage of the assembly constituted by roller 24 and shaft 32 when said assembly has to be inspected or replaced.

As is more particularly shown in FIGS. 1 and 2, fragments of cans 40 containing nuclear fuels to be reprocessed are successively introduced into each of the buckets 26 of fuel 22 during the rotation of the latter by a substantially vertical chute 42 having an outer portion fixed to tank 10 and an inner portion carried by cover 18. Chute 42 issues above a hopper 44 also carried by cover 18 and whose end enters acid 12 so as to force the can fragments 40 to enter by the opening of bucket 26 facing hopper 44.

The apparatus according to the invention also comprises means for discharging the can fragments left behind after dissolving the nuclear fuels in the acid. These means are constituted by a chute 46 having an inner portion carried by cover 18 and an outer portion carried by tank 10.

According to the invention and as illustrated more particularly in FIG. 3, wheel 22 is rotated about its axis by means of a motor means 48 controlling the rotation of a drive shaft 50 traversing cover 18 to rotate a driving pinion 52 located within tank 10. The teeth of pinion 52 cooperate with a toothed wheel 54 fixed to the bucket wheel 22, so as to rotate the latter during the operation of the motor means 48. A hydraulic guard 56 defined between cover 18 and a case 58 supporting shaft 50 seals the passage of cover 18 through shaft 50. More specifically, the motor means 48 comprises a motor 60 which controls the rotation of shaft 50 by means of a motor reduction gear 62, an electrical braking and clutch system 64, a reduction gear 66, a coupling 68 and a bevel gear 70. As illustrated in FIG. 1, the axis of shaft 50 and pinion 52 is located in the vertical plane passing through the axis of wheel 22.

Preferably and in order to ensure the perfect alignment of the opening of hopper 44 with the opening of the corresponding bucket 26 recentering means are associated with the means for rotating wheel 22. These recentering means comprise in the represented embodiment, a control jack 72 which, by means of a rod 74 ensures the radial displacement of a wedge-shaped movable member 76 relative to a cam 78 fixed to shaft 50, wedge 76 and cam 78 being shown in plan view in FIG. 3a. As an example, when 12 buckets 26 are supported by wheel 22, the ratios of the teeth of pinion 52 and of the toothed wheel 54 are calculated so that pinion 52 performs a complete turn when wheel 54 performs a 1/12th of a turn. Thus, pinion 52, shaft 50 and cam 78 perform a complete turn during the rotation of wheel 22 corresponding to the passage of two successive buckets 26 in the front of hopper 44.

In the embodiment shown in FIG. 3, reduction gear 70, as well as movable member 76 and cam 78 are arranged within the case 58. Control rod 74 of member 76 enters the hollow shafts carrying the slave pinion of reduction gear 66, coupling 68 and the driving pinion of bevel gear 70.

During the reprocessing of nuclear fuel, the dissolving apparatus is preferably placed within a not shown confinement cell, whose wall 80 passes between reduction gear 66 and coupling 68, as is diagrammatically shown in FIG. 3.

According to the invention, rollers 24 which support and guide wheel 22 are arranged entirely within the tank 10 and above the horizontal plane passing through the axis of bucket wheel 22, said plane being positioned above the level of the acid 12 contained in the tank. In the same way, the means for rotating wheel 22 formed by pinion 52 and shaft 50 are entirely located above the plane passing through the axis of the rotary support, i.e. in the upper part of the tank. This arrangement makes it possible to eliminate virtually all risks of direct corrosion of rollers 24 and of the drive mechanism, whilst replacing by means of a hydraulic guard the rotary joints conventionally used level with the passage through the tank of a horizontal drive shaft.

As is more particularly illustrated in FIGS. 1 and 2, due to the safety and criticality conditions imposed during the reprocessing of nuclear fuels from a fast breeder reactor, tank 10 is flat and has a thickness which only just exceeds that of reel 22. In the plane of the wheel, it is shaped like a rectangular trapezium, whose inclined side 82 defines the bottom of the tank. As an example, bottom 82 of tank 10 can be inclined by approximately 20°. A bubble elevator 84 carried by cover 18 comprises a tube 86 immersed into the acid 12 and whose end issues into the deepest part of tank 10. Inclined base 82 and elevator 84 makes it possible to recycle to hopper 44 via pipe 88 the can fragments or other solid parts which have accidentally fallen into the bottom of tank 10.

A tranquilizing means 89 is located vertically in tank 10 level with the deepest part thereof so as to filter, for example by means of a screen 90, the solution of nuclear fuels in the acid before the latter is discharged through the discharge pipe 16. Tranquilizing means 89 makes it possible to prevent any accidental discharge of solid compounds through the discharge pipe. A drainage pipe 92, as well as the various inspection pipes 94, are also positioned downstream of tranquilizing means 89. The inspection pipes 94 can for example be formed by double rods for measuring the level and density and thermometer probe jackets, etc. In addition, a pipe 96 is used for discharging the dissolving gases from tank 10.

The apparatus according to the invention also has heating means which, in the present embodiment, are constituted by half-shells 98 fixed to the outer wall of the tank and arranged along the bottom 82 thereof and in which circulates a heat transfer fluid enabling the nitric acid 12 to be heated to boiling temperature.

The bubble elevator 84 is carried by cover 18 preferably in detachable manner by means of a not shown hydraulic guard in such a way that it can be optionally removed and replaced by a grab or a more powerful pumping system if a large solid compound drops into the tank 10.

The apparatus for dissolving nuclear fuels in nitric acid described hereinbefore with reference to FIGS. 1 to 3 functions in the following manner.

When tank 10 is filled with nitric acid by feed pipe 14 to a level defined by the discharge pipe 16, the latter is brought to the boiling temperature by heating means 98. With wheel 22 stationary, its correct centering having been checked by disengaging coupling 68 and by putting jack 72 into operation so as to bring wedge 76 within the cam 78, one of the buckets 26 is positioned in front of the opening of hopper 44 in such a way that a certain quantity of rod fragments containing nuclear fuel can be introduced by means of chute 42. When this introduction is at an end, electric motor 60 is started after engaging coupling 68, so as to rotate shaft 50, pinion 52 and cam 78 by a complete turn. Wheel 22 has then performed a 1/12th of a turn in such a way that the following bucket 26 comes in front of the opening of hopper 44. A further loading can then be carried out by means of chute 42, after checking the centering of the bucket relative to the hopper by means of wedge 76 and cam 78.

Thus, the rotation of wheel 22 and the loading of bucket 26 take place in a discontinuous manner and at a speed such that all the nuclear fuel contained in the fragments introduced into the buckets is dissolved in acid 12 and is discharged in a solution form by pipe 16. When the buckets emerge from the acid, they only contain can fragments, which are then discharged discontinuously from the buckets by gravity when the open end of said buckets is in the lower portion thereof and facing the discharge chute 46.

If solid particles accidentally form to the bottom of the tank during the operation of the apparatus said particles descend into the lowest part thereof due to the slope of bottom 82 and the vicinity of the heating means 98 which lead to the formation of bubbles close to wall 12 tending to raise these particles and assisting them in their slide towards the deepest part. The particles are then in the immediate vicinity of the end of pipe 86 of bubble elevator 84 in such a way that they are sucked in at the same time as solution 12 and are forced back by pipe 88 into hopper 84 so as to be introduced into the bucket 26 which, at that moment, faces the hopper. The screen 90 located at the base of the tranquilizing means 89 eliminates any possibility of solid particles from mixing with the solution leaving by pipe 16.

Due to the arrangement of rollers 24 in the upper part of tank 10, they are not subject to the direct action of the liquid nitric acid. However, it may be necessary for some reason and particularly due to mechanical wear of rollers 24 which may be accelerated by the action of dissolving vapours, to inspect or replace one of the rollers. Therefore, it may also be necessary to inspect or even change tank 10 or wheel 22 due to the corrosion to which they are exposed by the boiling nitric acid.

According to the invention, these different operations can easily by carried out by separating tank 10 from the assembly constituted by cover 18, rollers 24 and wheel 22. If a random one of the rollers 24 has to be removed or replaced, this operation can easily be carried out by removing wedge 38 so as to permit shaft 32 to rotate relative to sleeve 36. In view of the fact that that part of shaft 32 carrying roller 24 is offset with respect to the frustum-shaped portion 34, said rotation disengages the annular projection 30 from groove 28 and permits the removal of the assembly constituted by roller 24 and conical shaft 32 by taking said assembly out of its sleeve 36 via the holes 39 made in rim 22. During this operation, it is obvious that rim 22 is supported by the other rollers 24.

It is finally pointed out that the end of feed pipe 14 for acid 12 issues into the upper part of bottom 82 of tank 10, making it possible to ensure the washing of the tank bottom if it is emptied by pipe 92.

It is pointed out that the invention is not limited to the embodiments described and represented hereinbefore with reference to FIGS. 1 to 3a and in fact covers all variants thereof.

What is claimed is:

1. An apparatus for treating the compounds in a corrosive liquid comprising a fixed tank in which the liquid is placed, a horizontally axed rotary support which peripherally carries at least one bucket for receiving the compound to be treated, means for introducing the compound into the bucket, means for removing the compound from the bucket, means for rotating the rotary support about its shaft and means for guiding the rotary support during its rotation about its shaft, wherein the guidance means are entirely arranged within the tank, the guidance means and the driving means being positioned above a horizontal plane passing through the axis of the rotary support.

2. An apparatus according to claim 1, wherein the guidance means are constituted by support means arranged symmetrically with respect to the vertical plane passing through the axis of the rotary support.

3. An apparatus according to claim 2, wherein the support means comprise two series of at least one roller arranged symmetrically relative to the said vertical plane.

4. An apparatus according to claim 1, wherein it comprises a detachable cover which seals the tank in tight manner and carries the rotary support via guidance means.

5. An apparatus according to claim 4, wherein the means for introducing the compound into the liquid may comprise an intake chute having an outer portion carried by the tank and an inner portion carried by the cover, the intake chute issuing into a hopper carried by the cover and the means for discharging the compound out of the bucket may comprise a discharge chute having an outer part carried by the tank and an inner part carried by the cover.

6. An apparatus according to claims 4 or 5, wherein the means for rotating the rotary support comprise a motor means outside the tank controlling the rotation of a shaft traversing the cover and carrying a driving pinion positioned within the tank and cooperating with a toothed wheel integral with the rotary support.

7. An apparatus according to claim 6, wherein the shaft has a vertical axis and the sealing between the shaft and the cover is provided by means of a hydraulic guard.

8. An apparatus according to claims 3 or 4, wherein the rollers are carried by the cover, each roller being received on a shaft fixed to the cover by removable fixing means, the axis of said shaft level with the roller being offset with respect to its axis level with the cover so as to permit the removal of the rollers by rotating the shafts.

9. An apparatus according to claim 1, wherein it comprises means for recentering the bucket with respect to means for introducing the compound into the bucket.

10. An apparatus according to claim 9, wherein the recentering means are constituted by a cam fixed to the driving pinion and a movable member carried by the cover and which can engage the cam to ensure its positioning with respect to the cover.

11. An apparatus according to claim 1, wherein the bottom of the tank is inclined so as to define a ramp so as to bring compounds which have accidentally dropped into the tank in front of a suction system which reintroduces them into the bucket.

12. An apparatus according to claim 1, wherein the tank carries means for heating the liquid therein.

13. An apparatus according to claim 1, wherein the liquid feed and discharge pipes issue into the tank.

* * * * *